(12) United States Patent
Hershey et al.

(10) Patent No.: US 7,426,272 B2
(45) Date of Patent: Sep. 16, 2008

(54) INSTRUMENTATION PRIVACY METHODS AND APPARATUSES

(75) Inventors: John Erik Hershey, Ballston Lake, NY (US); Daniel White Sexton, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 743 days.

(21) Appl. No.: 10/304,407

(22) Filed: Nov. 26, 2002

(65) Prior Publication Data

US 2004/0101136 A1    May 27, 2004

(51) Int. Cl.
*H04L 9/00* (2006.01)
(52) U.S. Cl. ........................................ 380/42
(58) Field of Classification Search ........................ None
See application file for complete search history.

(56) References Cited

U.S. PATENT DOCUMENTS 5,727,064 A * 3/1998 Reeds, III .................. 380/270
5,995,623 A * 11/1999 Kawano et al. ............. 713/189
6,707,914 B1 * 3/2004 Bell ............................ 380/46
6,944,299 B1 * 9/2005 Mallela et al. .............. 380/262

FOREIGN PATENT DOCUMENTS

WO       WO 00/46954       8/2000

* cited by examiner

*Primary Examiner*—Pramila Parthasarathy
(74) *Attorney, Agent, or Firm*—Cantor Colburn LLP

(57) ABSTRACT

The present invention provides methods and apparatuses for implementing communications privacy on a class of two-way wireless control communications. The methods and apparatuses of the present invention are cryptographic in nature and are built on a symmetric cryptographic algorithm structure. The cryptographic algorithm structure generates keytext on a frame-by-frame basis and both directions of the communications control link are served by the same keytext frames. The methods and apparatuses of the present invention utilize a single outbound/inbound cryptographic generator, such as a shrinking generator or the like designed using six-sigma tools in order to ensure, within a predetermined probability, that the non-fixed encryption time does not cause operational problems.

30 Claims, 12 Drawing Sheets

INSTRUMENTATION PRIVACY METHODS AND APPARATUSES

FIELD OF THE INVENTION

The present invention relates generally to instrumentation privacy methods and apparatuses. More specifically, the present invention relates to methods and apparatuses for implementing communications privacy on a class of two-way wireless control communications. The methods and apparatuses of the present invention are cryptographic in nature and are built on a symmetric cryptographic algorithm structure. The cryptographic algorithm structure generates keytext on a frame-by-frame basis and both directions of the communications control link are served by the same keytext frames.

BACKGROUND OF THE INVENTION

Communications privacy has become increasingly important to the protection of business interests in a competitive global economy. This is made difficult by the widespread use of wireless communications and the like. Such wireless communications are often interceptible and exploitable beyond any existing communications control mechanisms. Therefore, it is prudent for businesses and others to seek and institute new, cost-effective electronic protective measures that allow the efficiency of the host processes to be maintained.

One relatively straightforward communications control mechanism is the use of encryption technology to protect vital, competitively valuable data and information from successful interception and subsequent exploitation. One significant problem faced by communications engineers and the like in attempting to provide such protection, however, is the relatively high speed that such encryption technology requires. This problem is compounded by the labor overhead required to institute and maintain the proper operation of such communications control mechanisms.

Expanding upon this problem, short-range wireless equipment control links and the like are becoming increasingly prevalent. Such control links, and the associated applications, require high-speed two-way communications with low latency. Many of these control links utilize star-like communications flows, wherein a central module broadcasts messages to outlying modules and the outlying modules respond to the central module in a pre-ordered fashion. These messages often contain vital, competitively valuable data and information related to products, services, installations, and the like. Typically, this sort of problem has been approached using cryptographic architectures wherein there is a separate encryption unit for outbound messages and a separate encryption unit for inbound messages.

What is needed are instrumentation privacy methods and apparatuses that protect these control links and the data and information transmitted on them from interception and subsequent exploitation. What is also needed are instrumentation privacy methods and apparatuses that are relatively simple to install, set up, and maintain, requiring only minimal labor overhead and not significantly impacting communications latency. Accordingly, what is needed are instrumentation privacy methods and apparatuses that utilize a single outbound/inbound cryptographic generator, such as a shrinking generator or the like designed using six-sigma tools in order to ensure, within a predetermined probability, that the non-fixed encryption time does not cause operational problems.

BRIEF SUMMARY OF THE INVENTION

As described above, the present invention provides methods and apparatuses for implementing communications privacy on a class of two-way wireless control communications. The methods and apparatuses of the present invention are cryptographic in nature and are built on a symmetric cryptographic algorithm structure. The cryptographic algorithm structure generates keytext on a frame-by-frame basis and both directions of the communications control link are served by the same keytext frames. The methods and apparatuses of the present invention utilize a single outbound/inbound cryptographic generator, such as a shrinking generator or the like designed using six-sigma tools in order to ensure, within a predetermined probability, that the non-fixed encryption time does not cause operational problems.

In one embodiment of the present invention, an instrumentation privacy apparatus includes a central module and an outlying module. The central module is operable for transmitting a first synchronous packet of data to the outlying module and the outlying module is operable for receiving the first synchronous packet of data from the central module. The outlying module is operable for transmitting a second synchronous packet of data to the central module and the central module is operable for receiving the second synchronous packet of data from the outlying module. The instrumentation privacy apparatus also includes a common keytext generator operable for according privacy to both the first synchronous packet of data and the second synchronous packet of data.

In another embodiment of the present invention, an instrumentation privacy method includes providing a central module and providing an outlying module. The instrumentation privacy method also includes transmitting a first synchronous packet of data to the outlying module and receiving the first synchronous packet of data from the central module. The instrumentation privacy method further includes transmitting a second synchronous packet of data to the central module and receiving the second synchronous packet of data from the outlying module. The instrumentation privacy method still further includes providing a common keytext generator operable for according privacy to both the first synchronous packet of data and the second synchronous packet of data.

In a further embodiment of the present invention, an instrumentation privacy method includes providing an m-bit shift register having a first clock and providing an n-bit shift register having a second clock. The instrumentation privacy method also includes setting the first clock and the second clock to a primary clock. The instrumentation privacy method further includes providing a bit selection module operable for receiving a first bit from a first modulo-two combiner and a second bit from a second modulo-two combiner. If the first bit is equal to zero, the bit selection module is operable for discarding the second bit and, if the first bit is equal to one, the bit selection module is operable for passing the second bit into a keytext frame and issuing a frame block clock pulse to the keytext frame.

DETAILED DESCRIPTION OF THE INVENTION

Figure 1:
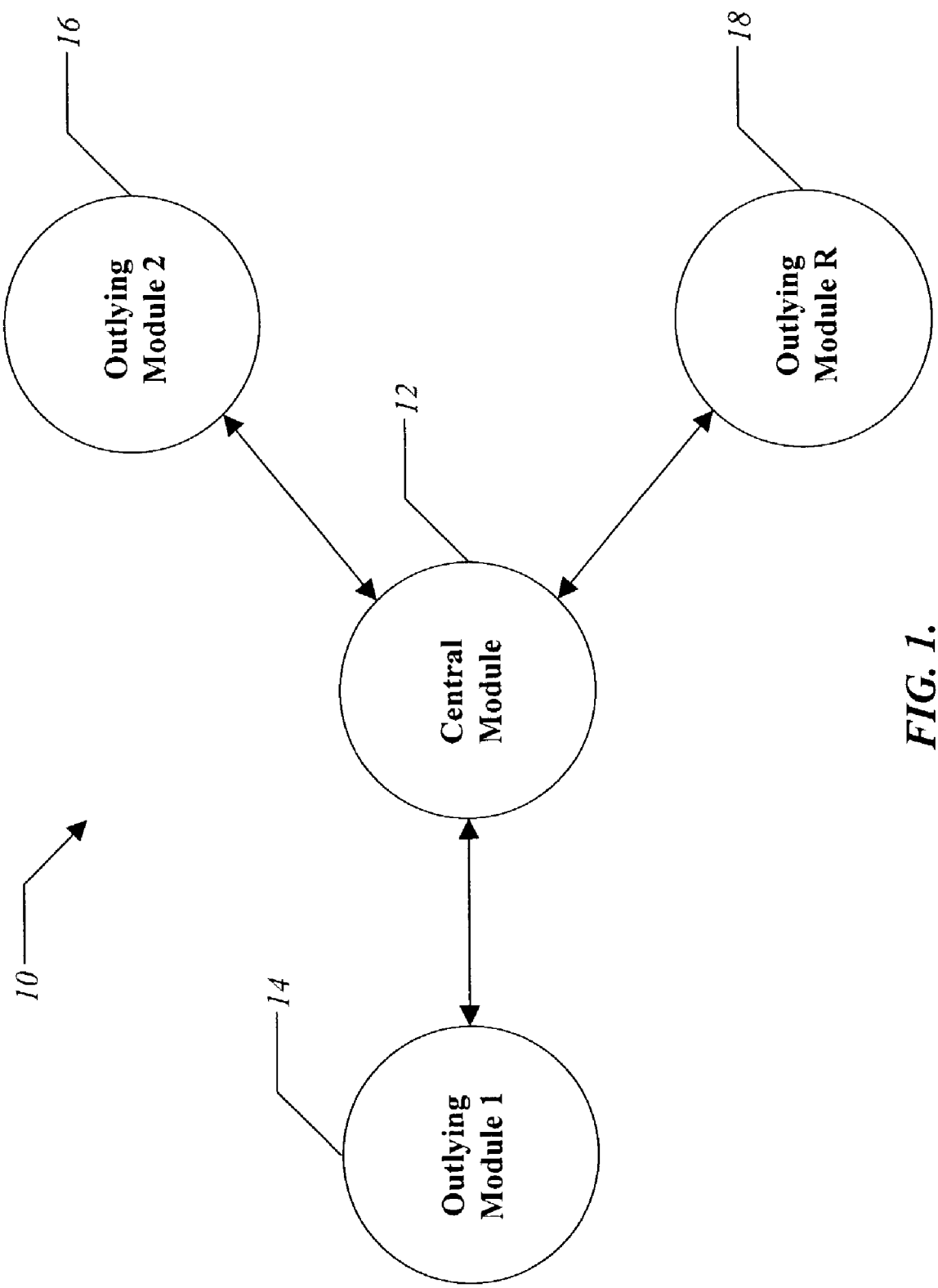
FIG. 1 is a schematic diagram illustrating a typical synchronous star network associated with the methods and apparatuses of the present invention.

An important class of problems associated with conventional instrumentation privacy methods and apparatuses is illustrated with reference to the synchronous star network 10 of FIG. 1. A central module 12 periodically transmits a synchronous packet of data to outlying module 1 14, outlying module 2 16, . . . , and outlying module R 18. The outlying modules 14,16,18 use the time boundaries of the central module's synchronous packets to determine the time boundaries for their transmissions to the central module 12. The time boundaries for the R outlying modules' synchronous packets are specified by, for example, a network installer prior to the commencement of communications. The time boundaries are assigned such that no two outlying modules 14,16,18 are transmitting at the same time, which would lead to a collision between outlying module synchronous packets. A typical synchronous packet framing sequence is illustrated in FIG. 2.

Figure 2:
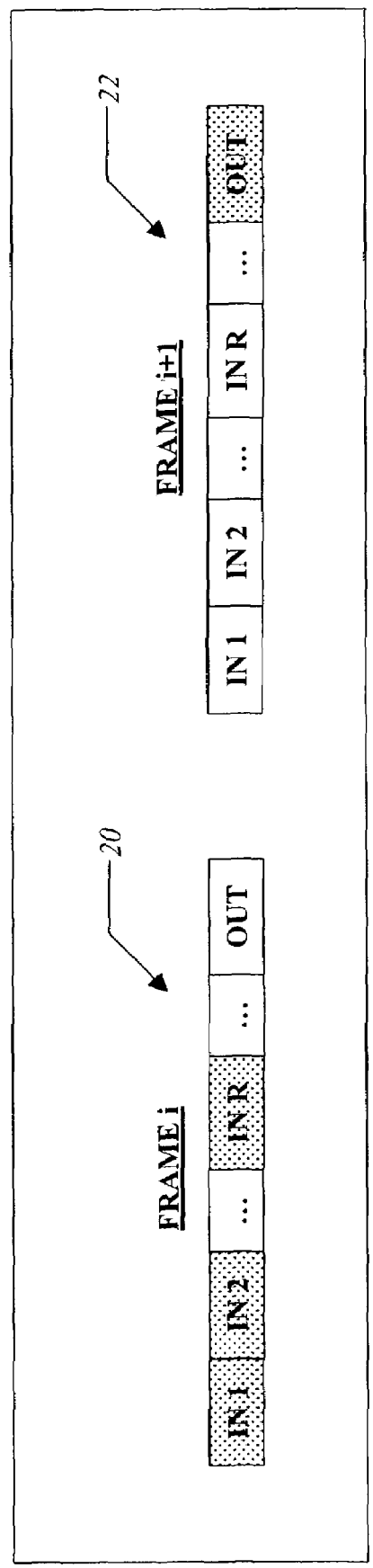
FIG. 2 is a schematic diagram illustrating a typical synchronous packet framing sequence associated with the methods and apparatuses of the present invention.

Referring to FIG. 2, two sequential frames of data, frame i 20 and frame i+1 22, are illustrated. Transmissions from the central module 12 (FIG. 1) to the outlying modules 14,16,18 (FIG. 1) are labeled OUT and transmissions from the outlying modules 14, 16, 18 to the central module 12 are labeled IN 1, IN 2, . . . , and IN R, respectively. In this example, the i-th OUT synchronous packet precedes the i+1$^{st}$ outlying module R synchronous packet response.

Figure 3:
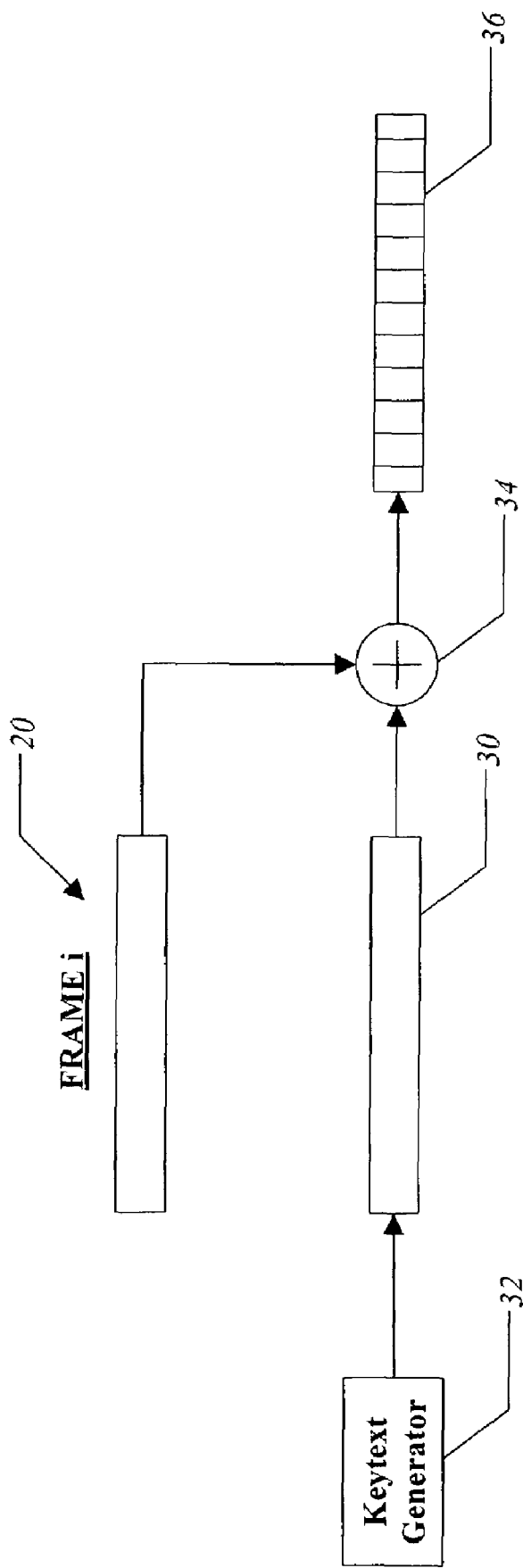
FIG. 3 is a schematic diagram illustrating one embodiment of a keytext generator operable for providing keytext for the encryption/decryption of a data frame.

Both the transmissions from the central module 12 to the outlying modules 14,16,18 and the transmissions from the outlying modules 14,16,18 to the central module 12 are accorded privacy by the same keytext generator. FIG. 3 illustrates the frame keytext block 30 that is produced by the keytext generator 32. The keytext supplied by the keytext generator 32 has previously been extracted from the keytext generator's keytext frame 40 (FIG. 4) and buffered, depending upon the status of the associated module (i.e., whether the associated module is the central module 12 (FIG. 1) or an outlying module 14,16,18 (FIG. 1)). The same keytext generator 32 is provided at the central module 12 and all outlying modules 14,16,18. The keytext for the encryption/decryption of frame i 20 is bit-by-bit modulo two added to the appropriate contents of frame i 20 by the exclusive-or logic gate 34. The exclusive-or logic gate 34 performs the following function:

| INPUT LINE 1 | INPUT LINE 2 | EXCLUSIVE-OR OUTPUT |
|---|---|---|
| 0 | 0 | 0 |
| 0 | 1 | 1 |
| 1 | 0 | 1 |
| 1 | 1 | 0 |

For a transmission from the central module 12 to all of the outlying modules 14,16,18, the keytext 36 is used to encrypt the OUT portion of the data frame and decrypt the IN portions of the data frame. For a transmission from the i-th outlying module, the keytext 36 is used to encrypt the i-th IN portion of the data frame and decrypt the OUT portion of the data frame.

Figure 4:
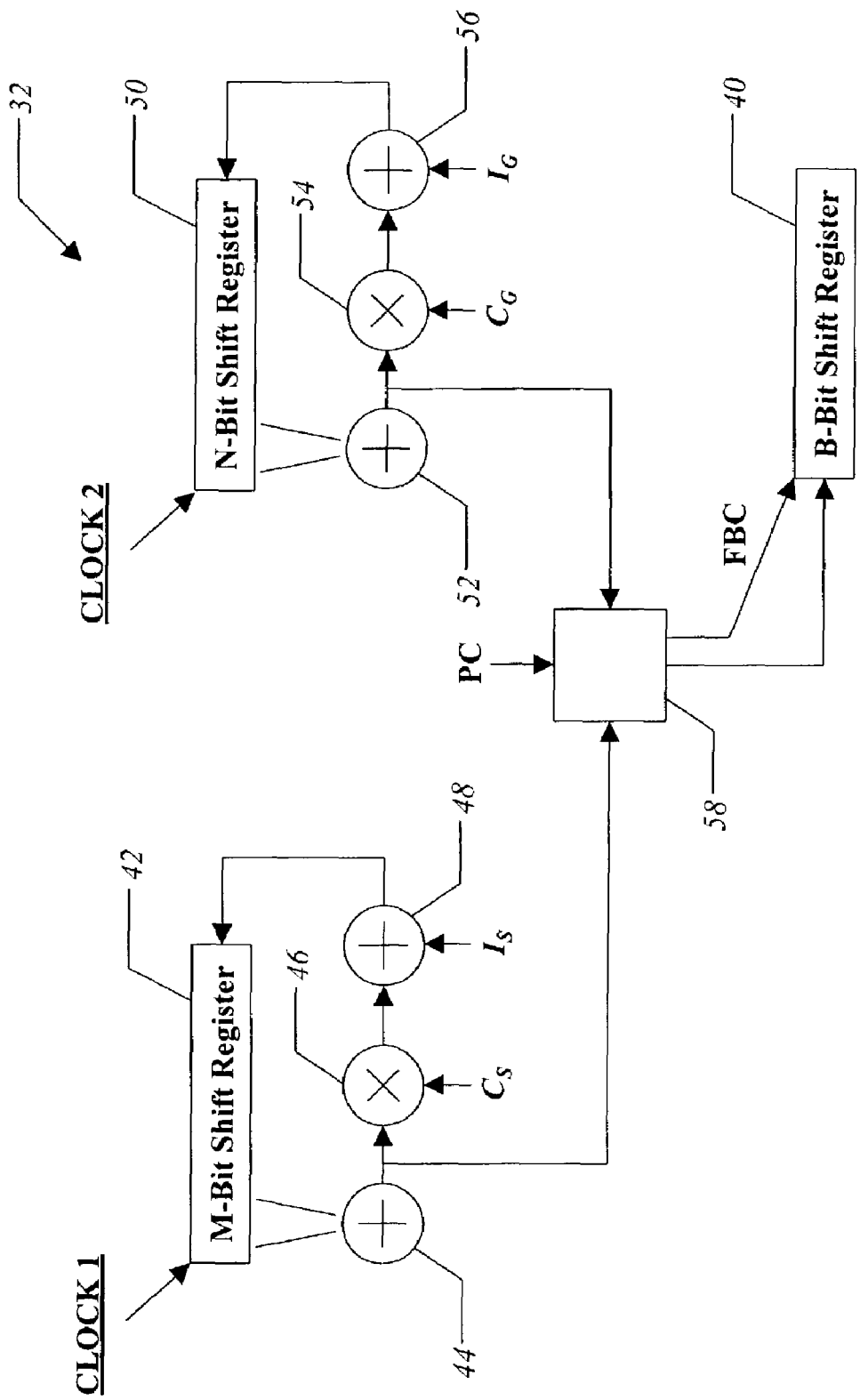
FIG. 4 is a schematic diagram illustrating one preferred embodiment of a cryptographic instrumentation privacy apparatus of the present invention.

The components of the keytext generator 32 are illustrated in FIG. 4. In one preferred embodiment of the present invention, the keytext generator 32 is a shrinking generator, well known to those of ordinary skill in the art. It should be noted, however, that other suitable types of keytext generators may be utilized, as appropriate. The keytext generator 32 includes two shift registers 42,50 of m-bits length and n-bits length, respectively, with modulo-two feedback from stages whose contents are summed together and reduced by two modulo-two combiners 44,52, respectively. The stages of a register whose contents are summed together are chosen such that a register with feedback will generate an m-sequence of length two to the number of stages in the register minus one. Appropriate stages for extracting content in order to create an m-sequence are specified by a primitive polynomial of a degree equal to the number of stages in the register, as is well known to those of ordinary skill in the art.

The outputs of the two modulo-two combiners 44,52 are input into two multiplier logic gates 46,54, respectively. A multiplier logic gate performs the following function:

| INPUT LINE 1 | INPUT LINE 2 | MULTIPLIER OUTPUT |
|---|---|---|
| 0 | 0 | 0 |
| 0 | 1 | 0 |
| 1 | 0 | 0 |
| 1 | 1 | 1 |

The outputs of the two multiplier logic gates 46,54 are input into two exclusive-or logic gates 48,56, respectively. The outputs of the two exclusive-or logic gates 48,56 are input into the two shift registers 42,50, respectively.

Figure 5:
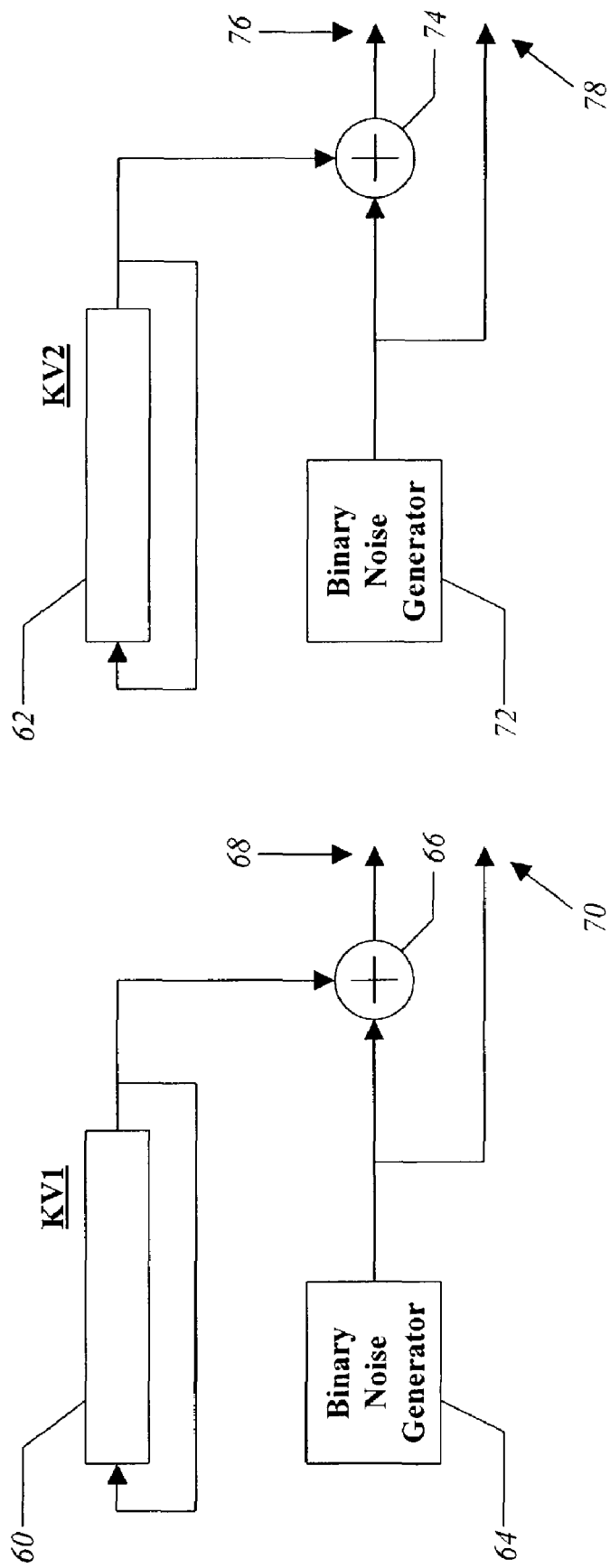
FIG. 5 is a schematic diagram illustrating the components of the cryptographic instrumentation privacy apparatus of the present invention involved in a pre-operation mode.

The keying variables for the shrinking generator consist of a secret m-bit binary vector denoted by KV1 and a secret n-bit binary vector denoted by KV2. These keying variables are entered into and stored in two registers 60,62, as illustrated in FIG. 5. Referring to FIGS. 4 and 5, there are two modes of the keytext generator 32: (i) a pre-operation mode and (ii) a keytext generation mode. Each mode specifies the various control signals, $C_S$, $I_S$, $C_G$, $I_G$, and their respective settings.

In the pre-operation mode, the central control module control signals $C_G$=0 and $C_G$=0. The input $I_S$ is connected to the output 68 of an exclusive-or logic gate 66 (see FIG. 5). The two inputs to the exclusive-or logic gate 66 consist of the outputs of the keytext storage register KV1 60 and a binary noise generator 64. In the pre-operation mode, CLOCK1 is clocked m-times, with the result that KV1 is rotated end-around for m-steps and the keytext storage register KV1 60 returns to its original setting. The binary noise from the binary noise generator 64 is broadcast to the outlying modules 14, 16, 18 (FIG. 1) via an output 70, each of which adds the m-binary noise bits modulo-two to KV1 and places the bit-by-bit mod 2 sum in the m-bit shift register 42. The input $I_G$ is also connected to the output 76 of an exclusive-or logic gate 74 (see FIG. 5). The two inputs to the exclusive-or logic gate 74 consist of the outputs of the keytext storage register KV2 62 and a binary noise generator 72. In the pre-operation mode, CLOCK2 is clocked n-times, with the result that KV2 is rotated end-around for n-steps and the keytext storage register KV2 62 returns to its original setting. The binary noise from the binary noise generator 72 is broadcast to the outlying modules 14, 16, 18 via an output 78, each of which adds the n-binary noise bits modulo-two to KV2 and places the bit-by-bit mod 2 sum in the n-bit shift register 50.

In the keytext generation mode, the clocks of both shift registers 42, 50, CLOCK1 and CLOCK2, respectively, are set to a primary clock (PC). The control signals, $C_S$, $I_S$, $C_G$, $I_G$, are set according to: $C_S=1$, $I_S=0$, $C_G=1$, and $I_G=0$. The two shift registers 42, 50 are clocked by the PC with feedback according to their respective primitive polynomials. The bits produced by the modulo-two combiners 44, 52 are input to a bit selection module 58. The bit selection module 58 operates as follows:

If the bit from the output of the modulo-two combiner 44 is a zero, the bit selection module 58 discards the bit input from the modulo-two combiner 52 and the bit selection module 58 does not issue a frame block clock (FBC) pulse to the keytext frame 40;

If the bit from the output of the modulo-two combiner 44 is a one, the bit selection module 58 passes the bit from the output of the modulo-two combiner 52 into the keytext frame 40 and issues an FBC pulse to the keytext frame 40.

This process continues until the keytext frame 40 has been filled from the bit selection module 58. This will be the case after B-pulses from the FBC. When the keytext frame 40 has been filled, the contents of the keytext frame 40 are transferred to the register 30 (FIG. 3) and are ready to serve as the keytext for a encryption/decryption frame.

Because the shrinking generator is not a fixed-time algorithm, the keytext for a given frame will not be ready unless there have been B-pulses from the FBC. On the average, the FBC pulse rate will be one-half the PC pulse rate. By increasing the PC pulse rate, B-pulses from the FBC may be assured and the keytext will be ready when it is needed.

It should be noted that the shrinking generator utilized by the instrumentation privacy methods and apparatuses of the present invention does not incorporate a default mode but, rather, utilizes a statistical design technique to reduce the probability that the problems described above arise to below a predetermined probability threshold. This is done by recognizing that the output of the FBC is well modeled as a Bernoulli process with probability one-half, that is, the FBC emits a pulse at any given clock time with probability one-half and its output is independent of prior outputs. Therefore, the number of FBC pulses in C PC pulses is well modeled as a binomial distribution wherein the probability of the number of FBC pulses, x, associated with C PC pulses is $2^{-C} \binom{C}{x}$. For moderately large values of C, such as C=100 or more, this probability is well modeled by a normal distribution.

What is needed is for C to be large enough so that the probability that x is greater than or equal to B is at least some predetermined probability $P_S$. This probability may be achieved via the following process:

1. Model x as a normal distribution with mean $\mu=C/2$ and variance $\sigma^2=C/4$;
2. Determine the number of times, T, that the keytext frame 40 will be filled;
3. Let p be the probability that the keytext frame 40 will be fully filled each of the T times;
4. Determine the number of standard deviations or sigmas, S, required so that p is greater than or equal to $P_S$; and
5. Given S and B, solve for C.

Step (5) above is performed by first noting that:

$$S = \frac{\frac{C}{2} - B}{\frac{\sqrt{C}}{2}}. \quad (1)$$

This equation is solved to yield:

$$C = \left(\frac{S + \sqrt{S^2 + 8B}}{2}\right)^2. \quad (2)$$

Figure 6:
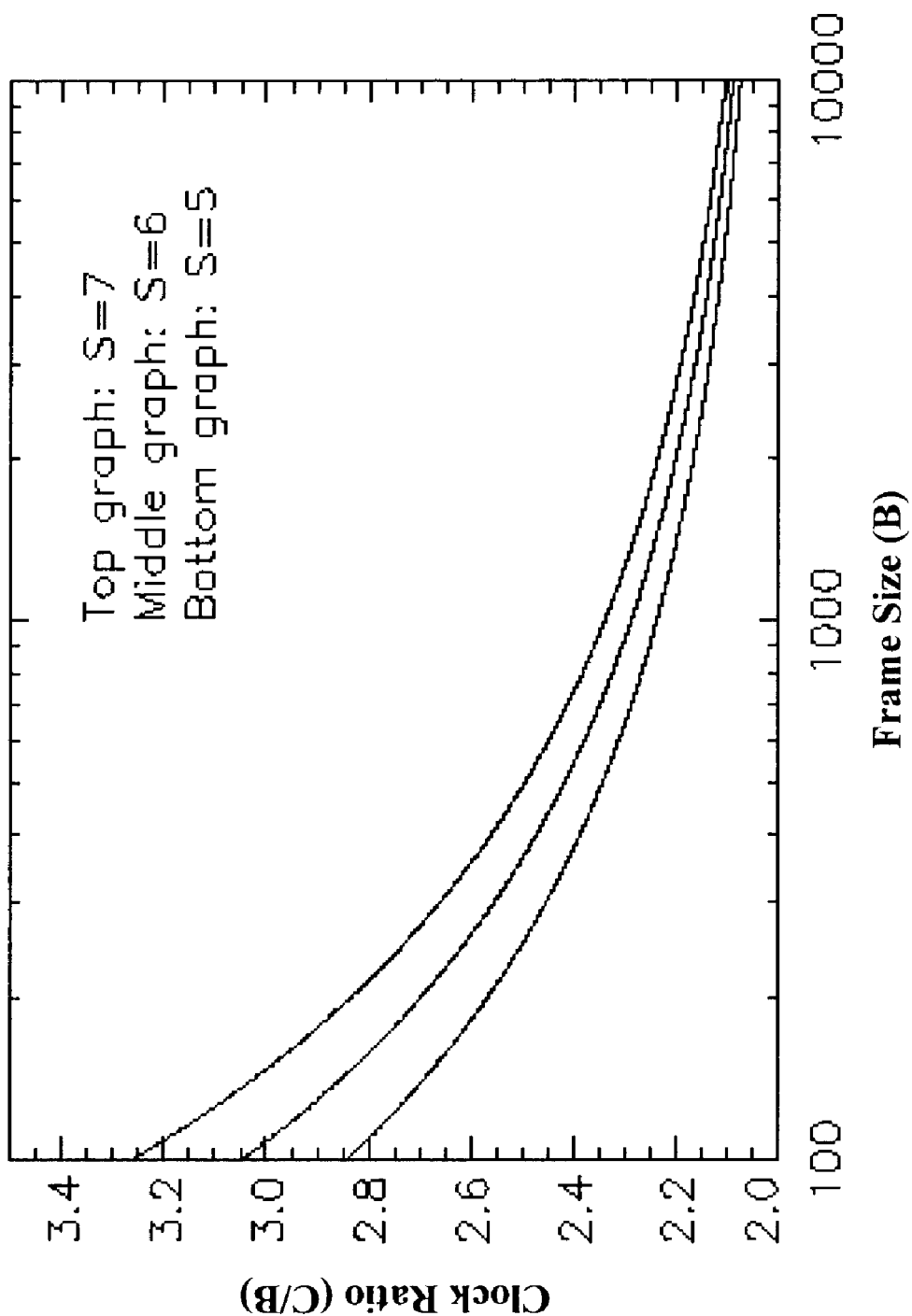
FIG. 6 is a plot of a clock ratio associated with the instrumentation privacy methods and apparatuses of the present invention for three values of a parameter S (standard deviations or sigmas)

The ratio C/B is the number of PC clock pulses allocated per required keytext frame bit required to meet equations (1) and (2). This ratio is referred to as the clock ratio and is plotted in FIG. 6.

An added refinement to the implementation described above includes filling the keytext frame 40 with randomly generated bits prior to developing keytext. As the keytext is developed and the register 40 is shifted, the random bits are shifted out. In the event that the register 40 has not been filled with keytext before that is required, the register contents are used as they are in a time of need. Such an event would result in errors in those messages using randomly generated bits.

As described above, one problem associated with the shrinking generator is that it does not have a fixed time algorithm and it is unclear what measures should be taken to compensate for this. Thus, a frame of keytext data may not be ready when needed. As described above, the shrinking generator's operation may be cast in statistical terms and the shrinking generator's time may be modeled to finish as a Gaussian variable. The shrinking generator may also be initialized in a pre-operation mode, generating and transmitting a binary noise sequence before starting or restarting. Additionally, various parameters of the shrinking generator may be specified in order that it's behavior may be further modeled and it's non-fixed time behavior compensated for, as described below. A further pre-operation mode may be utilized that does not require the generation and transmission of binary random noise. Advantageously, this pre-operation mode allows explicit message sequencing information to be incorporated in the message header and used for pre-operation setup.

As described above, the shrinking generator is built using m-sequences. An m-sequence is a binary sequence produced according to a primitive polynomial. Typically, an m-sequence has been used to simulate, and, conversely, may be modeled by, a balanced binary Bernoulli source—a source of ones and zeros with equal probability and no memory. Up to a point, such a simulation is appropriate and useful. However, when the sequence of bits generated by an m-sequence greatly exceeds the degree of the m-sequence's primitive polynomial, the correspondence to a balanced binary Bernoulli source is severely strained.

This issue is important to the operation of the shrinking generator, especially in the mode wherein the shrinking generator is required to periodically produce a B-bit frame of keytext. If the frame is not ready when required, the system may fail. This will occur if:

$$S = \sum_{n=n_1}^{n=n_2} s_1(n) < B, \quad (3)$$

where $n_2-n_1+1$ is the number of clock pulses per frame time and $\{s_1(n)\}$ is the sequence of bits, the m-sequence, produced by the m-bit shift register controlling the bit selection module.

Figure 7:
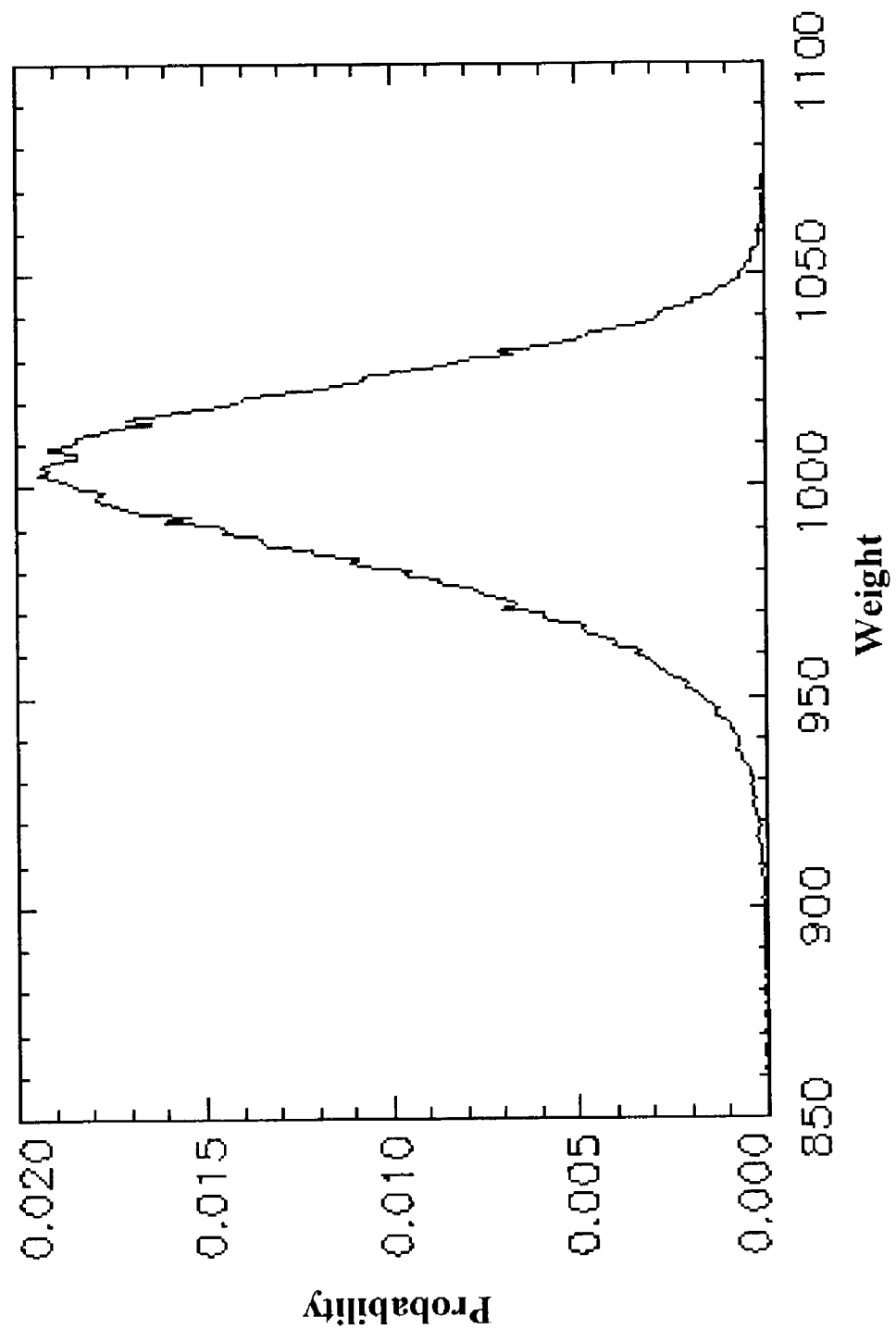
FIG. 7 is a plot illustrating a distribution of ones produced by an m-sequence according to $x^{41}+x^3+1$ for intervals of 2,000 clock times (100,000 trials each starting a recursion at a randomly chosen setting)

In the case of the shrinking generator, the problem arises if $n_2-n_1+1$ is greater than the degree of the primitive polynomial producing $\{s_1(n)\}$. To illustrate this, FIG. 7 shows the distribution of ones produced by the m-sequence according to $x^{41}+x^3+1$ for intervals of 2,000 clock times (100,000 trials each starting the recursion at a randomly chosen setting). The distribution shown in FIG. 7 is not normal. The minimum value is 858, the maximum value is 1,073, and the mean is 1,000. The shape is leptokurtic with a kurtosis of 3.933.

Figure 8:
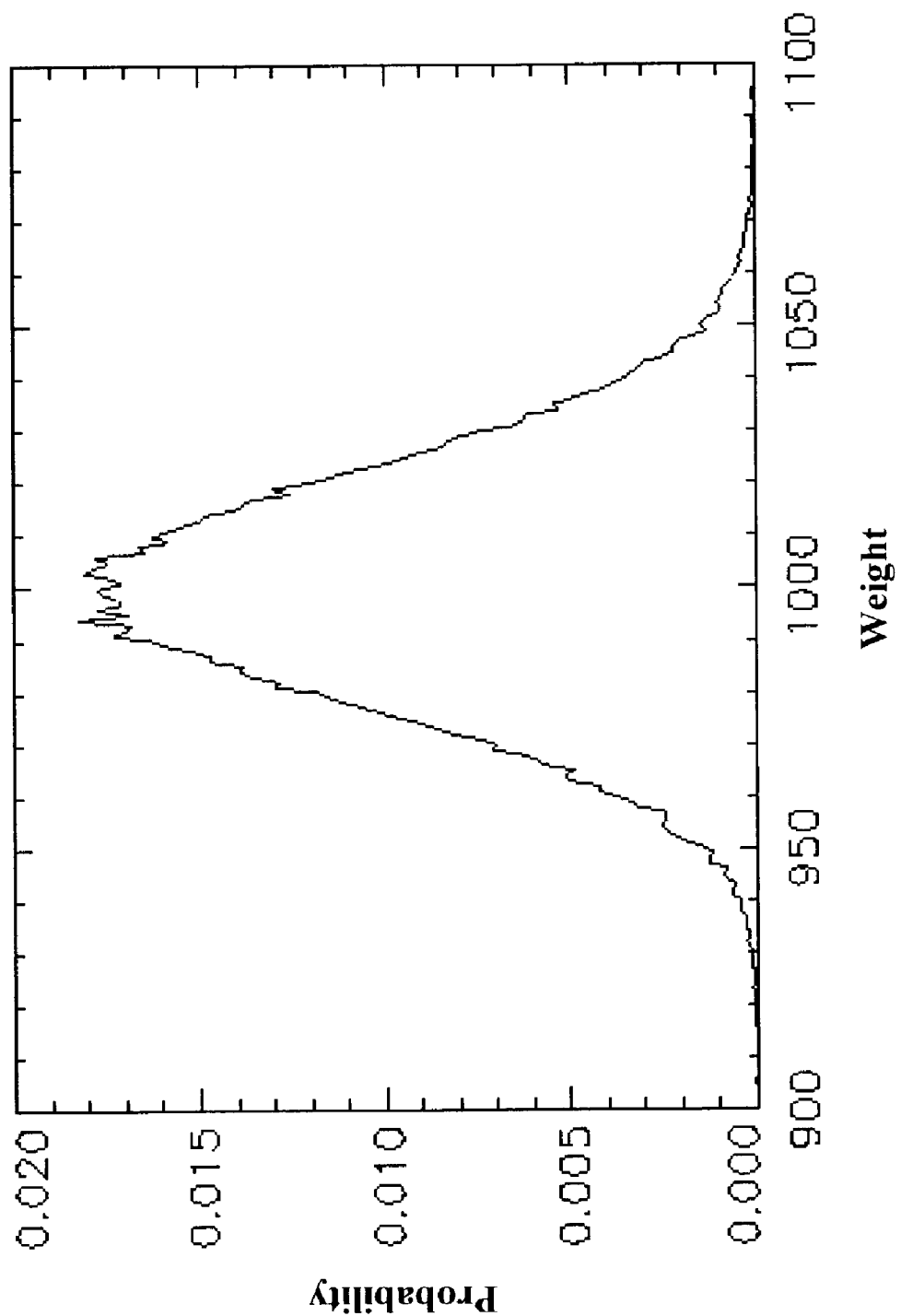
FIG. 8 is a plot illustrating a distribution of ones produced by an m-sequence according to $x^{2,281}+x^{715}+1$ in successive intervals of 2,000 clock times (100,000 trials, but starting a recursion only once at a randomly chosen point)

If, however, an m-sequence of a very high degree is used (such as $x^{2,281}+x^{715}+1$), normal statistics may be obtained. FIG. 8 illustrates the distribution of ones produced by the m-sequence according to $x^{2,281}+x^{715}+1$ in successive intervals of 2,000 clock times (100,000 trials, but starting the recursion only once at a randomly chosen point). The distribution shown in FIG. 8 is an excellent candidate for a normal distribution. The minimum value is 905, the maximum value is 1,095, and the mean is 1,000. The kurtosis is 3.005.

By using an m-sequence whose degree is greater than the keytext frame length, it is possible to make the statistics that of a normal distribution. Advantageously, one may then accurately estimate the probability of the system's failure to fill a keytext frame.

In some operational situations, it may be advantageous to send packets of data with unencrypted headers that list the number of the packet such that the receiver(s) may decrypt the packets even if they did not receive previous packets due to a communications blockage or the like. In order to accommodate these cases, an additional pre-operation mode may be utilized that uses the number of the packet as the seed for initializing the shrinking generator. The number of the packet is not reused as this may precipitate a cryptographic depth issue (wherein two or more messages in a machine or similar cipher have been enciphered on the same machine-setting or on the same key, allowing a cryptanalyst to recover both plaintext messages without knowing the cryptographic machine's keying variable).

Figure 9:
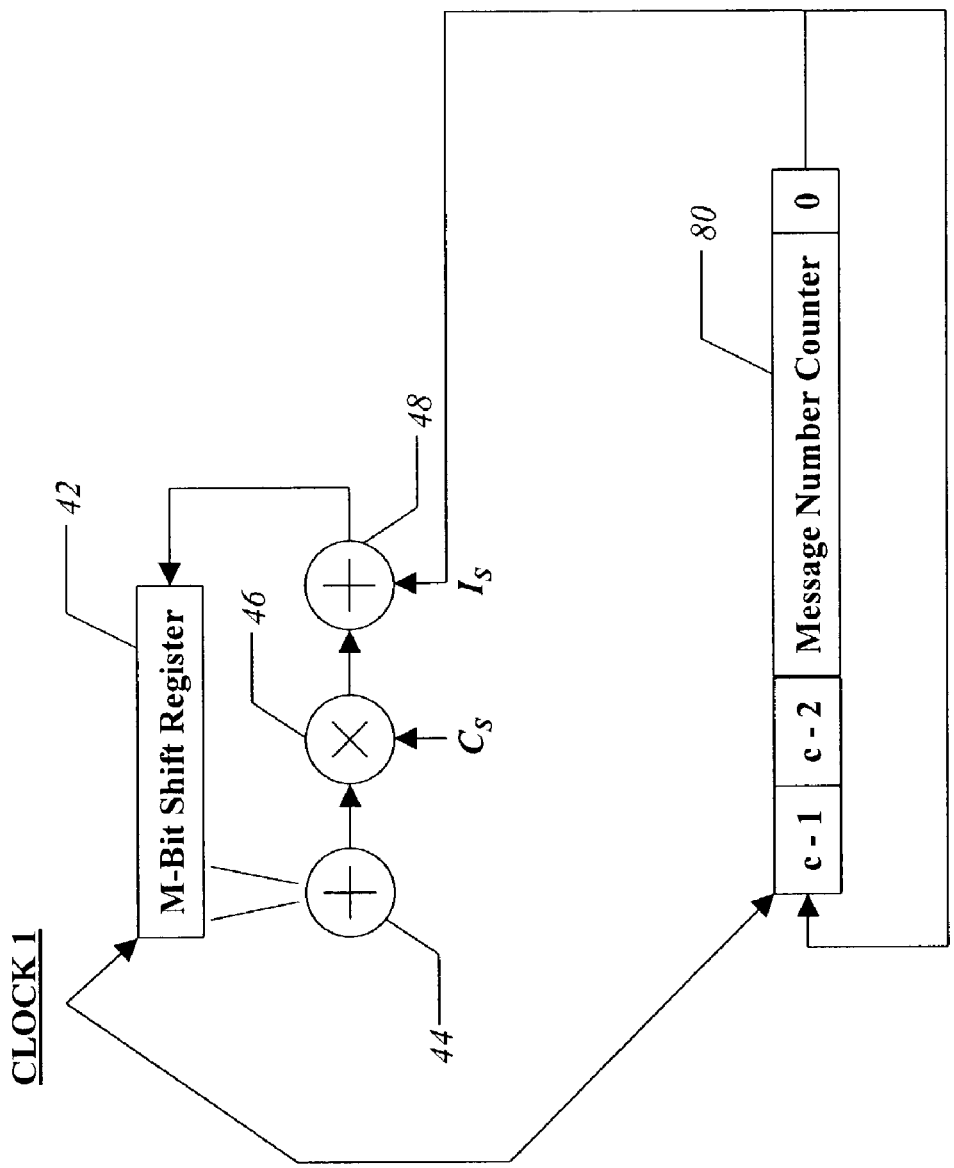
FIG. 9 is a schematic diagram illustrating the components of the cryptographic instrumentation privacy apparatus of the present invention involved in an additional pre-operation mode.

As described above, m=2281, n=41, and N=1,000. In the additional pre-operation mode, only the m-stage shift register is utilized and there is no generation of binary noise. FIG. 9 illustrates the configuration of this additional pre-operation mode. Referring to FIG. 9, a c-bit binary counter 80 is loaded with the message number in the additional pre-operation mode. The shift register 42 is loaded with the secret m-bit binary vector KV1 and $C_S$=1 and $I_S$ is connected to the least significant bit (LSB) end of the message number counter 80. Additional pre-operation mode clocking is via CLOCK1. The procedure involves running CLOCK1 for P pulses in the additional pre-operation mode. P must be large enough for the shift register 42 to start the keytext generation mode at a substantially different setting for each message.

Because the shift register 42 is a linear machine, the effects of the contents of the message number counter 80 on the message-to-message changes of the contents of the shift register 42 at the start of keytext generation may be, to some extent, characterized.

As the central encryption unit increments the c-bit binary counter 80, the LSB toggles for each new message, the next bit toggles at half the rate that the LSB toggles, and so on through the c bits of the c-bit binary counter 80. Using this understanding of the behavior of the c-bit binary counter 80, a two-step procedure may be used to select P. Given m and c, the number of bits changed in the contents of the shift register 42 may be assessed as the c-bit binary counter 80 is incremented. The contents of all of the stages of the shift register 42 are set to zero and the first i bits of the c-bit binary counter 80 are set to one. CLOCK1 pulses are then applied and the number of one bits in the shift register 42 are noted. $\{\max(n)\}$ is defined as the largest number of ones in the shift register 42 at clock pulse n for the range $0 \leq i \leq c-1$ and, likewise, $\{\min(n)\}$ is defined as the smallest number. $\Delta$ is computed and is defined as:

$$\Delta(n) = \left|\max(n) - \frac{m}{2}\right| + \left|\frac{m}{2} - \min(n)\right|. \quad (4)$$

Figure 10:
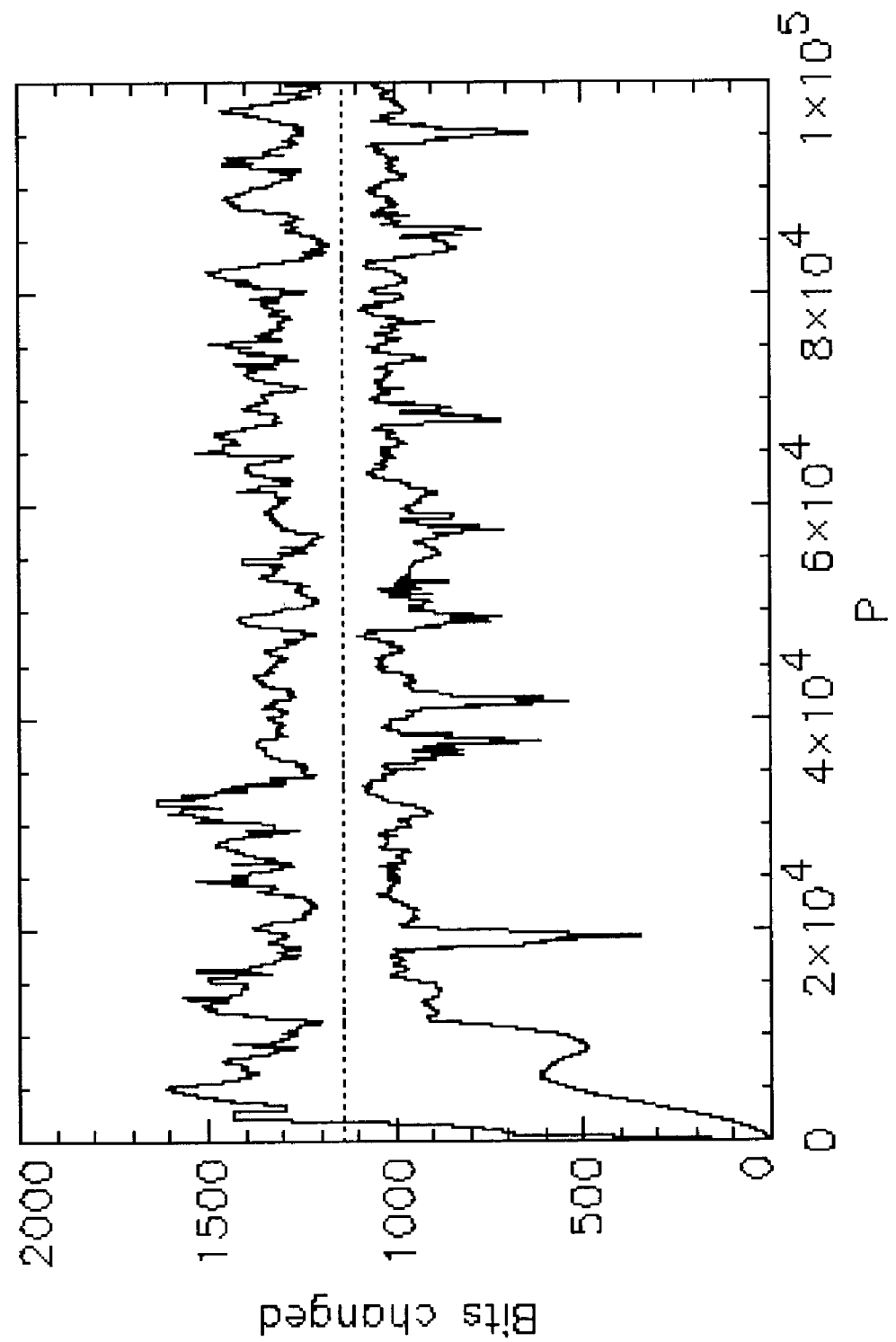
FIG. 10 is a plot of {max(n)} (upper curve) and {min(n)} (lower curve) versus P for m=2,281 and c=30.
Figure 11:
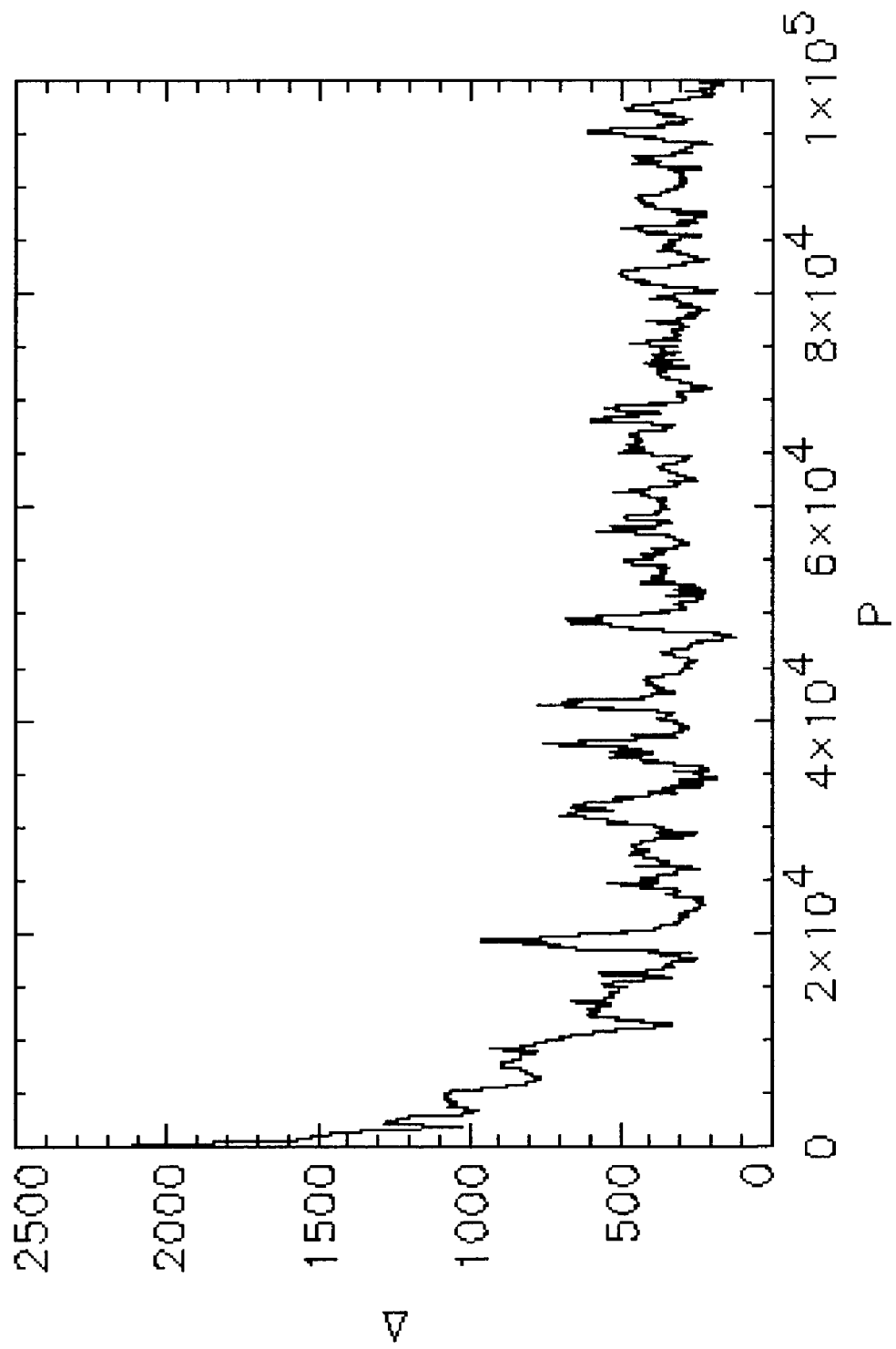
FIG. 11 is a plot of {Δ(n)}.

Referring to FIGS. 10 and 11, $\{\max(n)\}$ (upper curve) and $\{\min(n)\}$ (lower curve) are plotted versus P for m=2,281 and c=30, and $\{\Delta(n)\}$ is plotted. This first portion of the test measures the decorrelation between the initial contents of the shift register 42 between two sequential messages, i.e., messages M and M+1.

From these results, it may be seen that, given a value of P less than 20,000, a randomization of the contents of the shift register 42 may be approximated prior to each message's encryption. Specifically, when P=17,523, there is a local minimum value of $\Delta$ and that is $\Delta(17,523)$=248.

Figure 12:
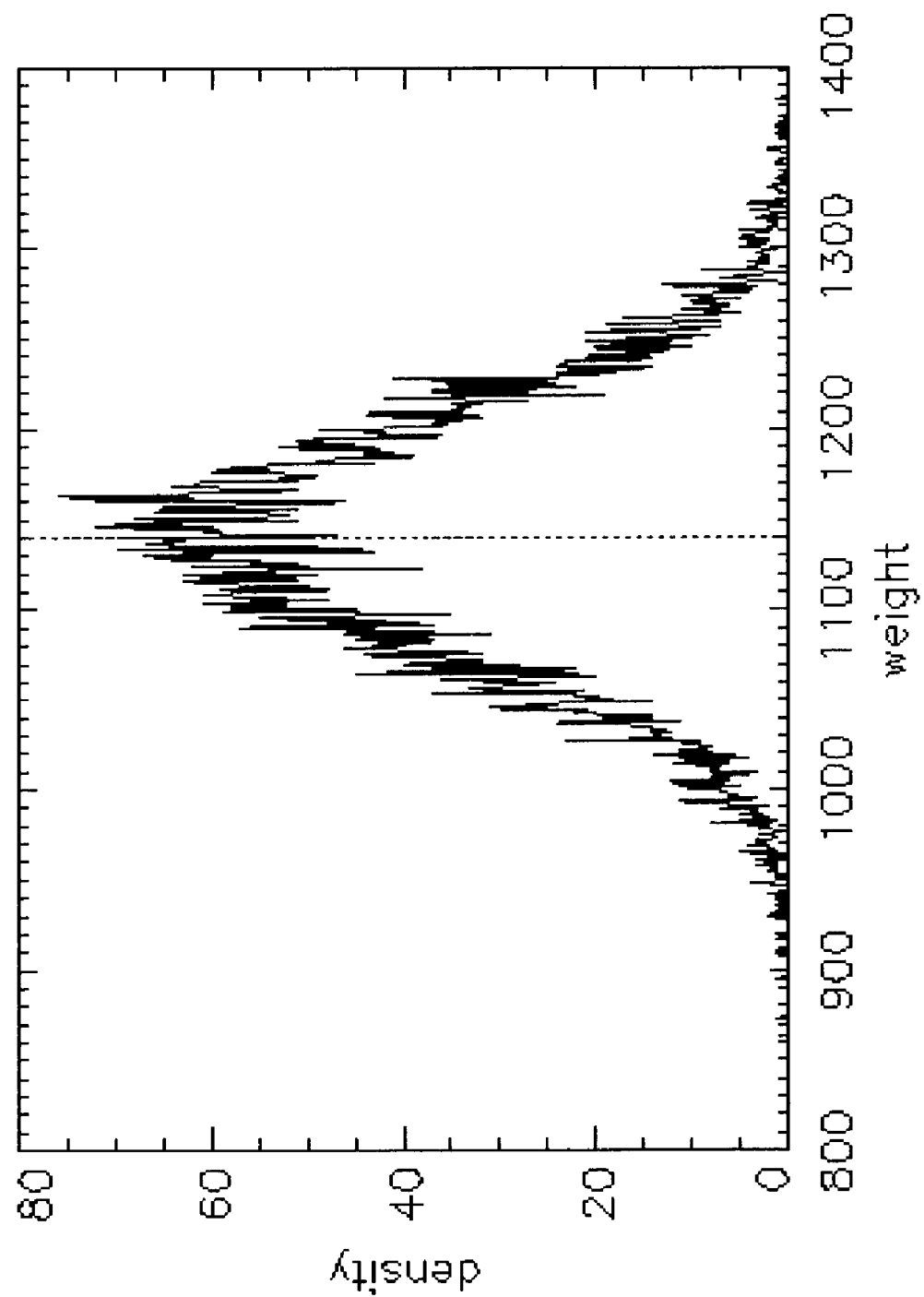
FIG. 12 is a plot illustrating the distribution of the number of bits different between two initial shift register contents.

The second step of the procedure involves checking to see that $\Delta(17,523)$ remains suitably small for random togglings of message counter bits. This latter part of the procedure considers the correlation between initial shift register contents for two non-sequential messages. Random contents are selected for the message number counter 80 and P is set to 17,523, as determined in the formed part of the procedure. The distribution of the number of bits different between the two initial shift register contents is illustrated in FIG. 12. The histogram of FIG. 12 is highly leptokurtic. The kurtosis is almost 31 and the maximum deviation below m/2 is 277.5 and the maximum deviation above m/2 is 258.5. Therefore, this procedure is expected to have arrived at a value for P that may reasonably be expected to decorrelate the initial shift register contents between messages.

It is apparent that there have been provided, in accordance with the methods and apparatuses of the present invention, instrumentation privacy methods and apparatuses for implementing communications privacy on a class of two-way wireless control communications. Although the methods and apparatuses of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. An instrumentation privacy apparatus, comprising: a central module; an outlying module; wherein the central module is operable for transmitting a first synchronous packet of data to the outlying module and the outlying module is operable for receiving the first synchronous packet of data from the central module; wherein the outlying module is operable for transmitting a second synchronous packet of data to the central module and the central module is operable for receiving the second synchronous packet of data from the outlying module; and a common keytext generator operable for according privacy to both the first synchronous packet of data and the second synchronous packet of data; the common keytext generator providing an m-bit shift register having an m-bit sequence that is greater than a keytext frame length, the common keytext generator comprising a shrinking generator; the shrinking generator comprising an m-bit binary vector and an n-bit binary vector.

2. The instrumentation privacy apparatus of claim 1, wherein the common keytext generator is operable for producing a frame keytext block.

3. The instrumentation privacy apparatus of claim 1, further comprising an exclusive-or logic gate operable for bit-by-bit modulo two adding keytext for the encryption/decryption of a frame to contents of the frame.

4. The instrumentation privacy apparatus of claim 3, wherein the keytext is used to encrypt an OUT portion of the frame and decrypt an IN portion of the frame for the transmission of the first synchronous packet of data from the central module to the outlying module.

5. The instrumentation privacy apparatus of claim 3, wherein the keytext is used to encrypt an IN portion of the frame and decrypt an OUT portion of the frame for the transmission of the second synchronous packet of data from the outlying module to the central module.

6. The instrumentation privacy apparatus of claim 1, wherein the common keytext generator further comprises an n-bit register.

7. The instrumentation privacy apparatus of claim 6, further comprising two modulo-two combiners operable for transmitting modulo-two feedback to the m-bit shift register and the n-bit shift register from stages whose contents are summed together and reduced.

8. The instrumentation privacy apparatus of claim 7, further comprising two multiplier logic gates operable for receiving outputs from the two modulo-two combiners.

9. The instrumentation privacy apparatus of claim 8, further comprising two exclusive-or logic gates operable for receiving outputs from the two multiplier logic gates and transmitting outputs to the m-bit shift register and the n-bit shift register.

10. The instrumentation privacy apparatus of claim 1, wherein the instrumentation privacy apparatus is operable for implementing communications privacy on a class of two-way wireless control communications.

11. An instrumentation privacy method, comprising: providing a central module; providing an outlying module; transmitting a first synchronous packet of data to the outlying module and receiving the first synchronous packet of data from the central module; transmitting a second synchronous packet of data to the central module and receiving the second synchronous packet of data from the outlying module; and providing a common keytext generator operable for according privacy to both the first synchronous packet of data and the second synchronous packet of data; the common keytext generator providing an m-bit shift register having an m-bit sequence that is greater than a keytext frame length, the common keytext generator comprising a shrinking generator; the shrinking generator comprising an m-bit binary vector and an n-bit binary vector.

12. The instrumentation privacy method of claim 11, further comprising producing a frame keytext block.

13. The instrumentation privacy method of claim 11, further comprising providing an exclusive-or logic gate operable for bit-by-bit modulo two adding keytext for the encryption/decryption of a frame to contents of the frame.

14. The instrumentation privacy method of claim 13, further comprising, using the keytext, encrypting an OUT portion of the frame and decrypting an IN portion of the frame for the transmission of the first synchronous packet of data from the central module to the outlying module.

15. The instrumentation privacy method of claim 13, further comprising, using the keytext, encrypting an TN portion of the frame and decrypting an OUT portion of the frame for the transmission of the second synchronous packet of data from the outlying module to the central module.

16. The instrumentation privacy method of claim 11, wherein providing the common keytext generator further comprises providing an n-bit shift register.

17. The instrumentation privacy method of claim 11, further comprising providing two modulo-two combiners operable for transmitting modulo-two feedback to the m-bit shift register and the n-bit shift register from stages whose contents are summed together and reduced.

18. The instrumentation privacy method of claim 17, further comprising providing two multiplier logic gates operable for receiving outputs from the two modulo-two combiners.

19. The instrumentation privacy method of claim 18, further comprising providing two exclusive-or logic gates operable for receiving outputs from the two multiplier logic gates and transmitting outputs to the m-bit shift register and the n-bit shift register.

20. The instrumentation privacy method of claim 11, wherein the instrumentation privacy method is operable for implementing communications privacy on a class of two-way wireless control communications.

21. An instrumentation privacy method, comprising: providing an m-bit shift register having a first clock; providing an n-bit shift register having a second clock; setting the first clock and the second clock to a primary clock; providing a bit selection module operable for receiving a first bit from a first modulo-two combiner and a second bit from a second modulo-two combiner; wherein, if the first bit is equal to zero, the bit selection module is operable for discarding the second bit; and wherein, if the first bit is equal to one, the bit selection module is operable for passing the second bit into a B-bit keytext frame and issuing a frame block clock pulse to the B-bit keytext frame; the bit selection module is operable for issuing B frame block clock pulses; and providing an m-sequence whose degree is greater than B.

22. The instrumentation privacy method of claim 21, further comprising transferring the contents of the B-bit keytext frame to a register to serve as keytext for an encryption/decryption frame.

23. The instrumentation privacy method of claim 22, further comprising transferring the contents of the B-bit keytext frame to a register to serve as keytext for an encryption/decryption frame.

24. The instrumentation privacy method of claim 23, wherein C is large enough so that the probability that x is greater than or equal to B is at least a predetermined probability Ps.

25. The instrumentation privacy method of claim 24, further comprising modeling x as a normal distribution with a mean equal to C/2 and a variance equal to C/4.

26. The instrumentation privacy method of claim 25, further comprising determining the number of times T that the B-bit keytext frame will be filled.

27. The instrumentation privacy method of claim 26, further comprising defining p as the probability that the B-bit keytext frame will be fully filled each of the T times.

28. The instrumentation privacy method of claim 27, further comprising determining the number of standard deviations S required so that p is greater than or equal to Ps.

29. The instrumentation privacy method of claim 28, further comprising solving for C using the equation: $5C=(S+S2+8B2)2$.

30. The instrumentation privacy method of claim 21, further comprising filling the B-bit keytext frame with randomly generated bits prior to developing keytext.

* * * * *

UNITED STATES PATENT AND TRADEMARK OFFICE
CERTIFICATE OF CORRECTION

PATENT NO.       : 7,426,272 B2
APPLICATION NO.  : 10/304407
DATED            : September 16, 2008
INVENTOR(S)      : Hershey et al.

It is certified that error appears in the above-identified patent and that said Letters Patent is hereby corrected as shown below:

In Column 10, Line 20, in Claim 15, delete "TN" and insert -- IN --, therefor.

In Column 12, Lines 5-6, in Claim 29, delete "5C=(S+S2+8B2)2." and insert -- $C = \left( \dfrac{S + \sqrt{S^2 + 8B}}{2} \right)^2$ . --, therefor.

Signed and Sealed this

Sixteenth Day of June, 2009

JOHN DOLL
*Acting Director of the United States Patent and Trademark Office*